United States Patent
Cole et al.

(10) Patent No.: US 11,573,683 B2
(45) Date of Patent: *Feb. 7, 2023

(54) SYSTEMS AND METHODS FOR REACTING TO MESSAGES

(71) Applicant: Slack Technologies, LLC, San Francisco, CA (US)

(72) Inventors: Adam Cole, San Francisco, CA (US); Pedro Carmo, San Francisco, CA (US); Kristin Au, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/385,262

(22) Filed: Jul. 26, 2021

(65) Prior Publication Data

US 2022/0129119 A1    Apr. 28, 2022

Related U.S. Application Data

(63) Continuation of application No. 17/079,173, filed on Oct. 23, 2020, now Pat. No. 11,079,907.

(51) Int. Cl.
*G06F 3/0482* (2013.01)
*H04L 51/10* (2022.01)

(52) U.S. Cl.
CPC ............ *G06F 3/0482* (2013.01); *H04L 51/10* (2013.01)

(58) Field of Classification Search
CPC ................ G06F 3/0482; G06F 3/0484; G06F 3/04842; H04L 51/10
See application file for complete search history.

(56) References Cited

U.S. PATENT DOCUMENTS

| | | | |
|---|---|---|---|
| 10,331,303 B1 * | 6/2019 | Gurtin | G06F 9/451 |
| 10,771,270 B2 * | 9/2020 | Sullivan | H04M 1/72436 |
| 2017/0075878 A1 | 3/2017 | Jon et al. | |
| 2017/0171267 A1 * | 6/2017 | Cornell | G06Q 10/10 |
| 2017/0220652 A1 | 8/2017 | Kazi et al. | |
| 2017/0336926 A1 | 11/2017 | Chaudhri | |
| 2018/0234371 A1 | 8/2018 | Lande et al. | |
| 2018/0287982 A1 | 10/2018 | Draeger et al. | |

(Continued)

OTHER PUBLICATIONS

Felipe Taliar Giuntini et al., How Do I Feel? Identifying Emotional Expressions on Facebook Reactions Using Clustering Mechanism, Jan. 1, 2019, IEEE Access, vol. 7, pp. 53909-57921 (Year: 2019).*

(Continued)

*Primary Examiner* — Tam T Tran
(74) *Attorney, Agent, or Firm* — Holland & Hart LLP

(57) ABSTRACT

A method includes displaying a message within an interface of a group-based communication platform on a device associated with a user; receiving, from the user, a selection of a first reactive emoji having a first skin tone for display in association with the message; and in response, displaying a first instance of the selected first reactive emoji having the first skin tone in a first grouping with at least a second instance of the first reactive emoji having a second skin tone different than the first skin tone, wherein the first grouping of the first instance and the at least the second instance is displayed in association with the message.

13 Claims, 11 Drawing Sheets

(56) References Cited

U.S. PATENT DOCUMENTS

| | | | |
|---|---|---|---|
| 2019/0058680 A1 | 2/2019 | Rosania et al. | |
| 2020/0396187 A1* | 12/2020 | Woo | H04L 51/10 |
| 2021/0026504 A1 | 1/2021 | Apthorp et al. | |

OTHER PUBLICATIONS

Melanie Swartz et al., Comparison of Emoji Use in Names—Profiles and Tweets, Feb. 1, 2020, IEEE Computer Society, pp. 375-380 (Year: 2020).*

"Die, Email, Die! A Flickr Cofounder Aims to Cut Us All Some Slack", ReadWriteWeb, LexisNexis, www.advance.lexis.com/api/permalink/33dd79e2-90f5-409d-ae27-5a2c7e86bf31/?context=1000516. (dated Aug. 14, 2013, 4:15 PM) 2 pages.

"How Slack changed the way we work by putting the customer experience first", Repeat Customer Podcast, Episode 3, [online][retrieved May 9, 2019]. Retrieved from the Internet: www.zendesk.com/resources/slack-customer-experience/, (2019) 13 pages.

Adrienne LaFrance, "The Triumph of Email", Atlantic Online, LexisNexis, www.advance.lexis.com/api/permalink/32d7ddd9-d4c1-4a73-86f7-08ab5842fde6/?context=1000516, (dated Jan. 6, 2016) 5 pages.

David Auerbach, "Re-Animator. How Stewart Butterfield created Flickr and Slack out of the ashes of failed projects" [online][retrieved May 9, 2019]. Retrieved from the Internet: www.slate.com/business/2014/05/stewart-butterfield-flickr-and-slack-how-he-snatched-victory-from-the-jaws-of-defeat.html. (dated May 28, 2014, 2:48 PM) 8 pages.

Ernie Smith, "Picking Up The Slack", Tedium, [online][retrieved May 9, 2019]. Retrieved from the Internet: www.tedium.co/2017/10/17/irc-vs-slack-chat-history/. (dated Oct. 17, 2017) 13 pages.

Giuntini et al. (2019) "How Do I Feel? Identifying Emotional Expressions on Facebook Reactions Using Clustering Mechanism," IEEE Access 7:53909-53921.

Internet Relay Chat, Wikipedia, [online][retrieved May 30, 2019]. Retrieved from the Internet: www.wikipedia.org/wiki/Internet_Relay_Chat. (dated May 28, 2019) 20 pages.

Jonathan Vanian, "Why these startups think chat apps are the next big thing in workplace collaboration", GIGAOM, LexisNexis, www.advance.lexis.com/api/permalink/e83778c8-09c8-43aa-9ba0-88526283de69/?context=1000516, dated Aug. 1, 2014, 5:45 PM) 4 pages.

Liu et al., (2019) "Integration of User Emotion and Self-Awareness in Text Messaging," IEEE 5th International Conference on Collaboration and Internet Computing (CIC), pp. 178-183.

Matsumoto, T. et al., "Chocoa Communicator—A New Communication System Based on Awareness and Text Communications-", FUJITSU Sci. Tech. J., 36, 2, (Dec. 2000) 154-161.

Matthew Ingram, "Flickr co-founder launches Slack, an all-in-one messaging tool designed to kill email forever", GIGAOM, LexisNexis, www.advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", PandoDaily, LexisNexis, www.advance.lexis.com/api/permalink/dd2d4ee5-2ddf-4d3a-a1d9-3bcee5e38b74/?context=1000516, (dated Feb. 6, 2015, 2:12 AM) 3 pages.

Mike Isaac, "Slack, a Start-Up With an App to Foster Business Collaboration, is Valued at $1.1 Billion", The New York Times Blogs (BITS), LexisNexis, www.advance.lexis.com/api/permalink/3eb84b34-a8f9-4d7d-9573-89d9598a4963/?context=1000516. (dated Oct. 31, 2014) 2 pages.

Oikarinen, J. & Reed, D., "Internet Relay Chat Protocol", Request for Comments: 1459, Network Working Group, [online][retrieved May 30, 2019], Retrieved from the Internet: www.rfc-editor.org/rfc/rfc1459.txt. (dated May 1993) 57 pages.

Rebecca Walberg, "Email biggest office waste of time: survey", National Post, At FP10, LexisNexis, www.advance.lexis.com/api/permalink/96268e3f-26ad-48ac-a98f-6c39804ebded/?context=1000516, (dated Mar. 4, 2014) 2 pages.

Robert Hof, "Stewart Butterfield on How Slack Became a $2.8 Billion Unicorn", Forbes, [online][retrieved May 9, 2019]. Retrieved from the Internet: www.forbes.com/sites/roberthof/2015/06/02/stewart-butterfield-on-how-slack-became-a-2-8-billion-unicorn-2/#7c31937d7d9c. (dated Jun. 2, 2015, 3;25 PM), 3 pages.

The Big Pivot w/ Slack's Stewart Butterfield, Masters of Scale Podcast, Episode 13 (Aired Nov. 14, 2017), www.mastersofscale.com/#/stewart-butterfield-the-big-pivot/, (dated Jan. 17, 2018) 27 pages.

* cited by examiner

502
Displaying a message within an interface of a group-based communication platform on a device associated with a user of the group-based communication platform

↓

504
Receiving, from the user, a selection of a first reactive emoji having a first skin tone for display in association with the message

↓

506
In response to receiving the user selection, displaying:

| A first instance of the selected first reactive emoji having the first skin tone in a first grouping with at least a second instance of the first reactive emoji having a second skin tone different than the first skin tone | A graphical indication of the first grouping of the first instance of the first reactive emoji having the first skin tone with the at least the second instance of the first reactive emoji having the second skin tone |

Wherein the first grouping of the first instance and the at least the second instance of the first reactive emoji is displayed in association with the message within the interface of the group-based communication platform on the device

FIG. 5

SYSTEMS AND METHODS FOR REACTING TO MESSAGES

CROSS REFERENCE TO RELATED APPLICATIONS

This application is a continuation of U.S. application Ser. No. 17/079,173, filed Oct. 23, 2020, the entire contents of which are incorporated herein by reference.

FIELD

The present disclosure relates generally to computer user interfaces, and more specifically to systems and methods for reacting to messages in a communication system.

BACKGROUND

A communication platform (e.g., messaging platform, email platform) can allow a user to react to a message using one or more emoji. For example, a group-based or channel-based communication system provides user interfaces for reacting to a message using emoji in addition to user interfaces for responding to the message. Multiple users can react to a message using different emoji, instances of each of which may be displayed along with the message. When multiple users react with the same emoji, a single instance of the emoji may be displayed along with a numerical indicator the number of users that selected the emoji, rather than by displaying multiple instances of the same reactive emoji.

SUMMARY

According to various embodiments, multiple instances of the same emoji but having different appearances, representing, for example, different skin tones, are displayed in a grouping along with a message. The emoji may be selected by different users for reacting to the message and one or more of the users may select different appearances of the same reactive emoji, such as based on a selection or a user-defined preference, and rather than displaying the multiple different appearances of the reactive emoji as individual, unrelated emoji, the multiple instances are displayed in a grouping to indicate their relatedness. This may be particularly desirable for users that select different skin tones for their emoji reactions to indicate a degree of solidarity between the different users and their reactions to the message while still reflecting the different preferences of the users.

According to some embodiments, a computer-implemented method includes displaying a message within an interface of a group-based communication platform on a device associated with a user of the group-based communication platform; receiving, from the user, a selection of a first reactive emoji having a first skin tone for display in association with the message; and in response to receiving the user selection, displaying: a first instance of the selected first reactive emoji having the first skin tone in a first grouping with at least a second instance of the first reactive emoji having a second skin tone different than the first skin tone, and a graphical indication of the first grouping of the first instance of the first reactive emoji having the first skin tone with the at least the second instance of the first reactive emoji having the second skin tone, wherein the first grouping of the first instance and the at least the second instance is displayed in association with the message within the interface of the group-based communication platform on the device.

In any of these embodiments, the graphical indication of the first grouping can include a graphical object that encompasses the first instance and at least the second instance of the first reactive emoji.

In any of these embodiments, the graphical indication can include a numerical indication of a number of times a reactive emoji of any skin tone has been selected for display in association with the message. In any of these embodiments, the numerical indication can be displayed in the first grouping. In any of these embodiments, a user input associated with the first instance of the first reactive emoji having the first skin tone displayed in the first grouping can result in a selection of the first reactive emoji having the first skin tone and an incrementing of the numerical indication.

In any of these embodiments, an order of display of the first instance of the first reactive emoji having the first skin tone and the at least the second instance of the first reactive emoji having the second skin tone can be based on a temporal order of selection of the first instance of the first reactive emoji having the first skin tone and the at least the second instance of the first reactive emoji having the second skin tone.

In any of these embodiments, the method can further include displaying a second grouping of a plurality of second reactive emoji, wherein the plurality of second reactive emoji includes at least two different skin tones.

In any of these embodiments, the method can further include: receiving a user request to display information associated with the first grouping of the first instance of the first reactive emoji having the first skin tone with the at least the second instance of the first reactive emoji having the second skin tone; and in response to the user request, displaying a first list of one or more users that selected the first reactive emoji having the first skin tone and a second list of one or more users that selected the first reactive emoji having the second skin tone. In any of these embodiments, the method can further include displaying a numerical indicator for each skin tone indicating a number of selections of the respective skin tone In any of these embodiments, the first and second lists can be displayed in a graphical object and the first instance of the first reactive emoji having the first skin tone and the at least the second instance of the first reactive emoji having the second skin tone are displayed in the graphical object.

According to various embodiments, an electronic device associated with a user of a group-based communication platform includes a display; one or more processors; a memory; and one or more programs, wherein the one or more programs are stored in the memory and configured to be executed by the one or more processors, the one or more programs including instructions for: displaying a message within an interface of a group-based communication platform on a device associated with a user of the group-based communication platform; receiving, from the user, a selection of a first reactive emoji having a first skin tone for display in association with the message; and in response to receiving the user selection, displaying: a first instance of the selected first reactive emoji having the first skin tone in a first grouping with at least a second instance of the first reactive emoji having a second skin tone different than the first skin tone, and a graphical indication of the first grouping of the first instance of the first reactive emoji having the first skin tone with the at least the second instance of the first reactive emoji having the second skin tone, wherein the first grouping of the first instance and the at least the second instance is displayed in association with the message within the interface of the group-based communication platform on the device.

In any of these embodiments, the graphical indication of the first grouping can include a graphical object that encompasses the first instance and at least the second instance of the first reactive emoji.

In any of these embodiments, the graphical indication can include a numerical indication of a number of times a reactive emoji of any skin tone has been selected for display in association with the message. In any of these embodiments, the numerical indication can be displayed in the first grouping. In any of these embodiments, a user input associated with the first instance of the first reactive emoji having the first skin tone displayed in the first grouping can result in a selection of the first reactive emoji having the first skin tone and an incrementing of the numerical indication In any of these embodiments, an order of display of the first instance of the first reactive emoji having the first skin tone and the at least the second instance of the first reactive emoji having the second skin tone can be based on a temporal order of selection of the first instance of the first reactive emoji having the first skin tone and the at least the second instance of the first reactive emoji having the second skin tone.

In any of these embodiments, the one or more programs can include further instructions for displaying a second grouping of a plurality of second reactive emoji, wherein the plurality of second reactive emoji includes at least two different skin tones.

In any of these embodiments, the one or more programs can include further instructions for: receiving a user request to display information associated with the first grouping of the first instance of the first reactive emoji having the first skin tone with the at least the second instance of the first reactive emoji having the second skin tone; and in response to the user request, displaying a first list of one or more users that selected the first reactive emoji having the first skin tone and a second list of one or more users that selected the first reactive emoji having the second skin tone. In any of these embodiments, the first and second lists can be displayed in a graphical object and the first instance of the first reactive emoji having the first skin tone and the at least the second instance of the first reactive emoji having the second skin tone are displayed in the graphical object. In any of these embodiments, the one or more programs can include further instructions for displaying a numerical indicator for each skin tone indicating a number of selections of the respective skin tone According to some embodiments, a non-transitory computer-readable storage medium storing one or more programs, the one or more programs comprising instructions, which when executed by one or more processors of an electronic device associated with a user of a group-based communication platform, cause the electronic device to: display a message within an interface of a group-based communication platform on a device associated with a user of the group-based communication platform; receive, from the user, a selection of a first reactive emoji having a first skin tone for display in association with the message; and in response to receiving the user selection, display: a first instance of the selected first reactive emoji having the first skin tone in a first grouping with at least a second instance of the first reactive emoji having a second skin tone different than the first skin tone, and a graphical indication of the first grouping of the first instance of the first reactive emoji having the first skin tone with the at least the second instance of the first reactive emoji having the second skin tone, wherein the first grouping of the first instance and the at least the second instance is displayed in association with the message within the interface of the group-based communication platform on the device. The computer-readable storage medium can store one or more programs for performing any of the methods described herein.

BRIEF DESCRIPTION OF THE DRAWINGS

The invention will now be described, by way of example only, with reference to the accompanying drawings, in which:

FIGS. 3A-3C illustrate an exemplary user interface of a group-based communication system for allowing a user to react to a message, respond to the message, or both, according to various embodiments;

FIG. 5 illustrates a method for reacting to a message, according to various embodiments.

DETAILED DESCRIPTION

Figure 1:
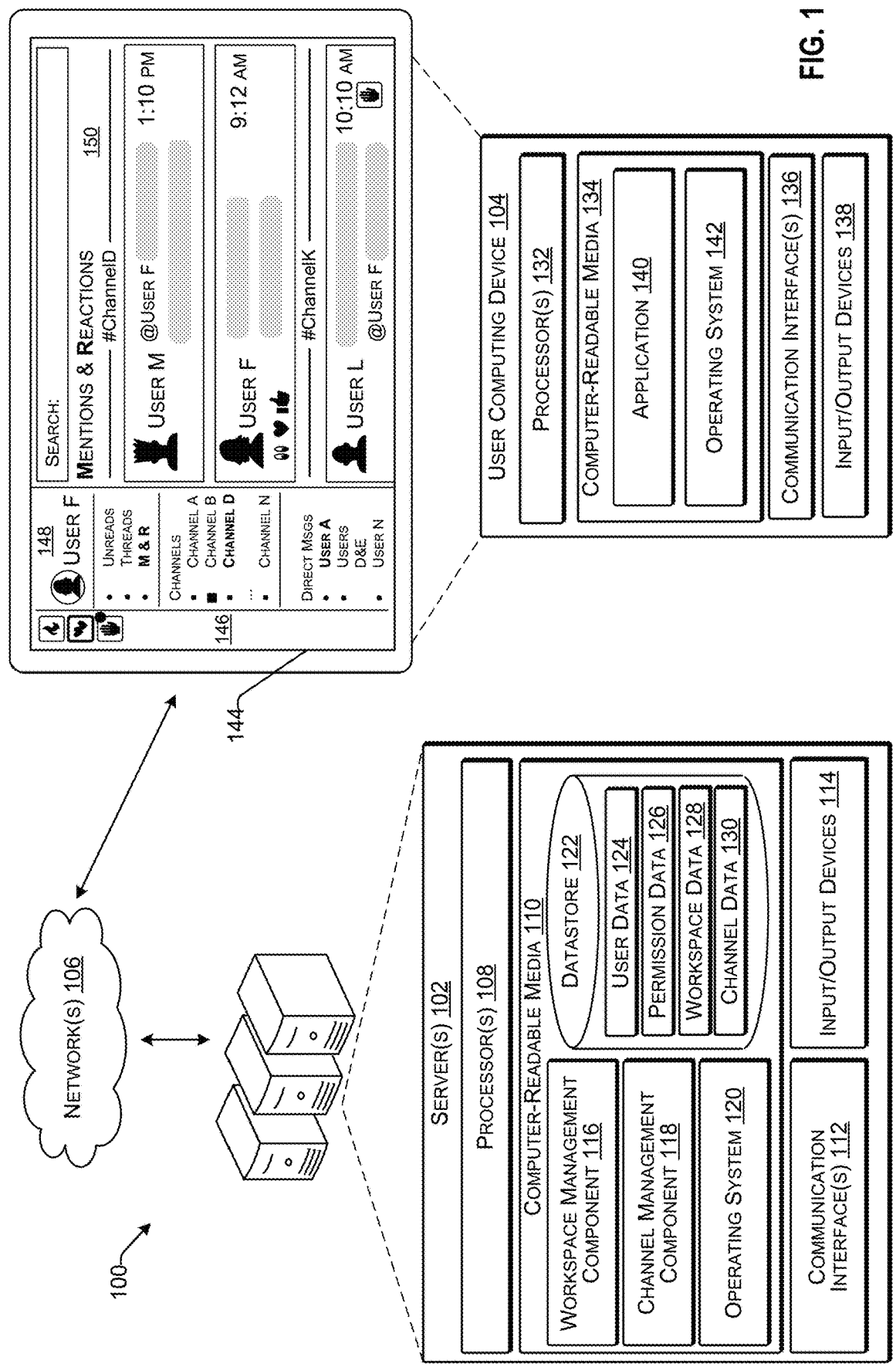
FIG. 1 illustrates an example environment for displaying messages and reactions within a group-based communication platform, according to various embodiments.

According to various embodiments, systems and methods described herein enable users to react to a message posted in a group-based communication with different visual appearances of the same emoji, such as different skin tones of a thumbs-up emoji or a smiling-face emoji. The different visual appearances of the same emoji that are selected by users for posting in reaction to a message are displayed as different instances of the emoji in association with the message. The different instances are displayed in a grouping to indicate the commonality of the different users' reactions. Thus, users can have personalized emoji appearances (e.g., different skin tones) while still having their reactions displayed in a manner that demonstrates their commonality with other users selecting different visual appearances of the same emoji.

In the following description of the various embodiments, reference is made to the accompanying drawings, in which are shown, by way of illustration, specific embodiments that can be practiced. It is to be understood that other embodiments and examples can be practiced, and changes can be made without departing from the scope of the disclosure.

In addition, it is also to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

FIG. 1 illustrates an example environment 100 for performing techniques described herein. In at least one example, the example environment 100 can be associated with a communication platform that can leverage a network-based computing system to enable users of the communication platform to exchange data. In at least one example, the communication platform can be "group-based" such that the platform, and associated systems, communication channels, messages, and/or virtual spaces, have security (that can be defined by permissions) to limit access to a defined group of users. In some examples, such groups of users can be defined by group identifiers, as described above, which can be associated with common access credentials, domains, or the like. In some examples, the communication platform can be a hub, offering a secure and private virtual space to enable users to chat, meet, call, collaborate, transfer files or other data, or otherwise communicate between or among each other. As described above, each group can be associated with a workspace, enabling users associated with the group to chat, meet, call, collaborate, transfer files or other data, or otherwise communicate between or among each other in a secure and private virtual space. In some examples, members of a group, and thus workspace, can be associated with a same organization. In some examples, members of a group, and thus workspace, can be associated with different organizations (e.g., entities with different organization identifiers).

In at least one example, the example environment 100 can include one or more server computing devices (or "server(s)") 102. In at least one example, the server(s) 102 can include one or more servers or other types of computing devices that can be embodied in any number of ways. For example, in the example of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can communicate with a user computing device 104 via one or more network(s) 106. That is, the server(s) 102 and the user computing device 104 can transmit, receive, and/or store data (e.g., content, information, or the like) using the network(s) 106, as described herein. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (TOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, or the like.

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and input/output devices 114.

In at least one example, each processor of the processor(s) 108 can be a single processing unit or multiple processing units, and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile and nonvolatile memory and/or removable and non-removable media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include a workspace management component 116, a channel management component 118, an operating system 120, and a datastore 122.

In at least one example, the workspace management component 116 can manage workspaces. That is, in at least one example, the communication platform can be partitioned into different workspaces, which can be associated with different groups of users, as described above. As described above, each workspace can be associated with a group identifier and one or more user accounts can be mapped to, or otherwise associated with, the group identifier. User(s) corresponding to such user account(s) can be "members" of the group.

In some examples, the workspace management component 116 can manage workspace membership. That is, the workspace management component 116 can receive requests to associate users with individual workspaces and the workspace management component 116 can associate user accounts associated with such users with group identifiers associated with the individual workspaces. For example, responsive to receiving a request to add a user to a workspace, the workspace management component 116 can associate a user account of the user with a group identifier of the workspace. The workspace management component 116 can disassociate user accounts and group identifiers, for example, when a user is removed from a workspace.

In at least one example, the workspace management component 116 can manage cross-workspace data integration, as described herein. For example, the workspace management component 116 can detect updates to data associated with a workspace and can integrate such updated data into user interface(s) presented via user computing device(s) of user(s) associated with the workspace. Such data integration can be "cross-workspace" such that, regardless of which workspace a user is logged in to, the user can receive updated data associated with each of the workspaces of which he or she is a member and/or access data associated with each of the workspaces of which he or she is a member (pending permissions, as described below). That is, the workspace management component 116 can detect updates to data associated with a workspace and can integrate such updated data into user interface(s) presented via user computing device(s) of user(s) associated with the workspace. Similarly, the workspace management component 116 can facilitate cross-workspace operations. For example, the workspace management component 116 can facilitate messages between workspaces, searches between or across multiple workspaces, and the like. Additional details of operations that can be performed by the workspace management component 116 are described below.

In at least one example, the channel management component 118 can manage communication channels. As described above, in at least one example, the communication platform can be a channel-based messaging platform, that in some examples, can be usable by group(s) of users. Users of the communication platform can communicate with other users via communication channels. A communication channel, or virtual space, can be a data route used for exchanging data between and among systems and devices associated with the communication platform. In at least one example, the channel management component 118 can establish a communication channel between and among various user computing devices, allowing the user computing devices to communicate and share data between and among each other. In at least one example, the channel management component 118 can manage such communications and/or sharing of data. In some examples, data associated with a communication channel can be presented via a user interface. In at least one example, the channel management component 118 can interact with the workspace management component 116 to manage the generation, presentation, and/or updating of user interfaces. Additional details of operations that can be performed by the channel management component 118 are described below.

In at least one example, the operating system 120 can manage the processor(s) 108, computer-readable media 110, hardware, software, etc. of the server(s) 102.

In at least one example, the datastore 122 can be configured to store data that is accessible, manageable, and updatable. In some examples, the datastore 122 can be integrated with the server(s) 102, as shown in FIG. 1. In other examples, the datastore 122 can be located remotely from the server(s) 102 and can be accessible to the server(s) 102 and/or user device(s), such as the user device 104. The datastore 122 can comprise multiple databases, which can include user data 124, permission data 126, workspace data 128, and channel data 130. Additional or alternative data may be stored in the data store and/or one or more other data stores.

In at least one example, the user data 124 can store data associated with users of the communication platform. In at least one example, the user data 124 can store data in user profiles (which can also be referred to as "user accounts"), which can store data associated with a user, including, but not limited to, one or more user identifiers associated with multiple, different organizations or entities with which the user is associated, one or more communication channel identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emojis, a plurality of conversations, a plurality of conversation topics, an avatar, an email address, a real name (e.g., John Doe), a username (e.g., j doe), a password, a time zone, a status, a token, and the like.

In at least one example, the permission data 126 can store data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with an individual user can be mapped to, or otherwise associated with, an account or profile associated with the user data 124. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In at least one example, the workspace data 128 can store data associated with individual workspaces. As described above, the communication platform can be partitioned into workspaces associated with groups of users. In at least one example, a group identifier can be associated with a workspace. In at least one example, the group identifier can indicate a physical address in the workspace data 128 where data related to the corresponding workspace is stored. In at least one example, data associated with workspace permissions can be stored in association with the group identifier, data identifying users associated with the workspace can be stored in association with the group identifier, data associated with messages and/or other content associated with the workspace can be stored in association with the group identifier, data associated with communication channels associated with the workspace can be stored in association with the group identifier, and the like. In some examples, workspaces can be associated with one or more organization identifiers, which can be associated with organizations or other entities associated with the communication platform. In some examples, such data can be mapped to, or otherwise associated with, other types of data in the datastore 122 (e.g., the user data 124, the permission data 126, the channel data 130, etc.).

In at least one example, the channel data 130 can store data associated with individual communication channels. In at least one example, the channel management component 118 can establish a communication channel between and among various user computing devices, allowing the user computing devices to communicate and share data between and among each other. In at least one example, a communication channel identification may be assigned to a communication channel, which indicates the physical address in the channel data 130 where data related to that communication channel is stored. A communication channel may be "public," which may allow any user within an organization (e.g., associated with an organization identifier) to join and participate in the data sharing through the communication channel, or a communication channel may be "private," which may restrict data communications in the communication channel to certain users or users having particular roles (e.g., managers, administrators, etc.). In some examples, a communication channel may be "shared," which may allow users associated with different organizations (e.g., entities associated with different organization identifiers) to join and participate in the data sharing through the communication channel. Shared channels may be public such that they are accessible to any user of either organization, or they may be private such that they are restricted to access by certain users or users having particular roles from both organizations.

In some examples, the datastore 122 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with organizations, groups (e.g., workspaces), communication channels, users, or the like.

In some examples, individual organizations can be associated with a database shard within the datastore 122 that stores data related to a particular organization identification. For example, a database shard may store electronic communication data associated with members of a particular organization, which enables members of that particular organization to communicate and exchange data with other members of the same organization in real time or near-real time. In this example, the organization itself can be the owner of the database shard and has control over where and how the related data is stored. In some examples, a database shard can store data related to two or more organizations (e.g., as in a shared channel).

In some examples, individual groups can be associated with a database shard within the datastore 122 that stores data related to a particular group identification (e.g., workspace). For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored.

In some examples, a communication channel can be associated with a database shard within the datastore 122 that stores data related to a particular channel identification. For example, a database shard may store electronic communication data associated with the communication channel, which enables members of that particular communication channel to communicate and exchange data with other members of the same communication channel in real time or near-real time. In this example, a group or organization can be the owner of the database shard and can control where and how the related data is stored.

In some examples, individual users can be associated with a database shard within the datastore 122 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Websockets, Application Programming Interfaces (APIs) (e.g., using API calls), HyperText Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 132, computer-readable media 134, one or more communication interfaces 136, and input/output devices 138.

In at least one example, each processor of the processor(s) 132 can be a single processing unit or multiple processing units, and can include single or multiple computing units or multiple processing cores. The processor(s) 132 can comprise any of the types of processors described above with reference to the processor(s) 108 and may be the same as or different than the processor(s) 108.

The computer-readable media 134 can comprise any of the types of computer-readable media 134 described above with reference to the computer-readable media 110 and may be the same as or different than the computer-readable media 110. Functional components stored in the computer-readable media can optionally include at least one application 140 and an operating system 142.

In at least one example, the application 140 can be a mobile application, a web application, or a desktop application, which can be provided by the communication platform or which can be an otherwise dedicated application. In some examples, individual user computing devices associated with the environment 100 can have an instance or versioned instance of the application 140, which can be downloaded from an application store, accessible via the Internet, or otherwise executable by the processor(s) 132 to perform operations as described herein. That is, the application 140 can be an access point, enabling the user computing device 104 to interact with the server(s) 102 to access and/or use communication services available via the communication platform. In at least one example, the application 140 can facilitate the exchange of data between and among various other user computing devices, for example via the server(s) 102. In at least one example, the application 140 can present user interfaces, as described herein. In at least one example, a user can interact with the user interfaces via touch input, keyboard input, mouse input, spoken input, or any other type of input.

A non-limiting example of a user interface 144 is shown in FIG. 1. As illustrated in FIG. 1, the user interface 144 can present data associated with one or more communication channels and, in some examples, one or more workspaces. That is, in some examples, the user interface can integrate data from multiple workspaces into a single user interface so that the user (e.g., of the user computing device 104) can access and/or interact with data associated with the multiple workspaces that he or she is associated with and/or otherwise communicate with other users associated with the multiple workspaces. In some examples, the user interface 144 can include a first region 146, or pane, that includes indicator(s) (e.g., user interface element(s) or object(s)) associated with workspace(s) with which the user (e.g., account of the user) is associated. In some examples, the user interface 144 can include a second region 148, or pane, that includes indicator(s) (e.g., user interface element(s) or object(s)) representing data associated with the workspace(s) with which the user (e.g., account of the user) is associated. Additional details associated with the second region 148 and indicator(s) are described below with reference to FIG. 2.

In at least one example, the user interface 144 can include a third region 150, or pane, that can be associated with a data feed (or, "feed") indicating messages posted to and/or actions taken with respect to one or more communication channels and/or other virtual spaces for facilitating communications (e.g., a virtual space associated with direct message communication(s), a virtual space associated with event(s) and/or action(s), etc.) as described herein. In at least one example, data associated with the third region 150 can be associated with the same or different workspaces. That is, in some examples, the third region 150 can present data associated with the same or different workspaces via an integrated feed. In some examples, the data can be organized and/or is sortable by workspace, time (e.g., when associated data is posted or an associated operation is otherwise performed), type of action, communication channel, user, or the like. In some examples, such data can be associated with an indication of which user (e.g., member of the communication channel) posted the message and/or performed an action. In examples where the third region 150 presents data associated with multiple workspaces, at least some data can be associated with an indication of which workspace the data is associated with. Additional details associated with the user interface 144, and the third region 150, are described below with reference to FIG. 2.

In at least one example, the operating system 142 can manage the processor(s) 132, computer-readable media 134, hardware, software, etc. of the server(s) 102.

The communication interface(s) 136 can include one or more interfaces and hardware components for enabling communication with various other devices (e.g., the user computing device 104), such as over the network(s) 106 or directly. In some examples, the communication interface(s) 136 can facilitate communication via Websockets, APIs (e.g., using API calls), HTTPs, etc.

The user computing device 104 can further be equipped with various input/output devices 138 (e.g., I/O devices). Such I/O devices 138 can include a display, various user interface controls (e.g., buttons, joystick, keyboard, mouse, touch screen, etc.), audio speakers, connection ports and so forth.

While techniques described herein are described as being performed by the workspace management component 116, the channel management component 118, and the application 140, techniques described herein can be performed by any other component, or combination of components, which can be associated with the server(s) 102, the user computing device 104, or a combination thereof.

Figure 2:
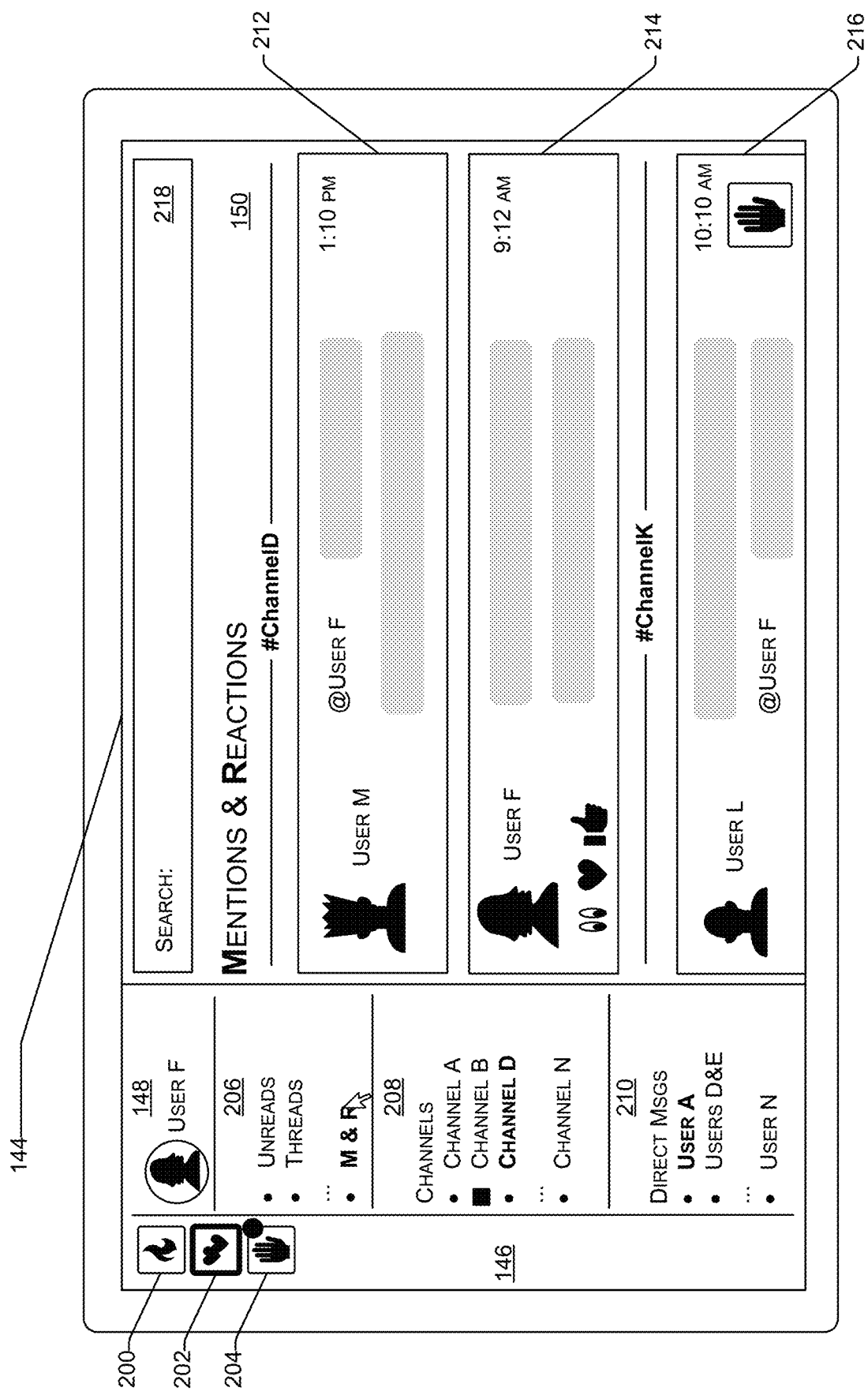
FIG. 2 illustrates aspects of a user interface, according to various embodiments.

FIG. 2 illustrates additional details associated with the user interface 144 that presents data associated with multiple workspaces, as described above with reference to FIG. 1.

As described above, in at least one example, the user interface 144 can include a first region 146, or pane, that includes indicator(s) (e.g., user interface element(s) or object(s)) of workspace(s) with which the user (e.g., account of the user) is associated. As illustrated in FIG. 2, the user (e.g., User F) can be associated with three different workspaces. In some examples, the workspaces can be associated with a same organization (e.g., associated with a same organization identifier). In some examples, one or more of the workspaces can be associated with different organizations (e.g., associated with different organization identifiers). In some examples, one of the workspaces can be associated with users from a single organization (e.g., associated with a same organization identifier) and another of the workspaces can be associated with users from two or more different organizations (e.g., associated with different organization identifiers).

In at least one example, each workspace can be associated with a different indicator 200-204, presented via the first region 146. In at least one example, a user account of the user (e.g., User F) can be associated with group identifiers that correspond to each of the workspaces (e.g., as determined by the user data 124 and/or the workspace data 128). As such, the user account of the user can be associated with each of the workspaces. A first indicator 200 can represent a first workspace, a second indicator 202 can represent a second workspace, and a third indicator 204 can represent a third workspace.

In some examples, the user can navigate between the workspaces by actuating a control associated with each of the indicators 200-204 without needing to log out of one workspace and log in to each of the other workspaces. Non-limiting examples of such indicators, or any indictors described herein, can include icons, symbols, links, tabs, or other user interface elements or objects. In some examples, such indicators can be associated with actuation mechanisms to enable a user to select an indicator and transition to another workspace. In some examples, a visual indicator can indicate which workspace a user is currently interacting with and/or most recently interacted with. For example, the second indicator 202 is outlined in a heavier weight than the first indicator 200 and the third indicator 204, thereby indicating which workspace the user is currently interacting with and/or most recently interacted with. In some examples, the indicators 200-204 can be associated with another indicator indicating that the corresponding workspace has been updated. An example is shown with respect to the third indicator 204.

While three indicators 200-204 are illustrated in FIG. 2, the user can be associated with any number of workspaces. In some examples, indicators associated with all of the workspaces with which a user is associated can be presented via the first region 146. In some examples, some of the indicators associated with all of the workspaces with which a user is associated can be presented via the first region 146 and the user can interact with the user interface 144 to view additional or alternative indicators. In examples where fewer than all workspaces are represented via the user interface 144, the indicators can be arranged in alphabetical order, in an order of most recent interaction, in an order based on most frequent interaction, or some other order.

In some examples, the first region 146 may not be included in the user interface 144, and such information can be integrated into the user interface 144 via additional or alternative mechanisms.

In some examples, the user interface 144 can include a second region 148, or pane, that includes indicator(s) (e.g., user interface element(s) or object(s)) representing virtual space(s) associated with the workspace(s) with which the user (e.g., account of the user) is associated. In at least one example, the second region 148 can include one or more sub-sections, or sub-panes, which can represent different virtual spaces. For example, a first sub-section 206 can include indicators representing virtual spaces that can aggregate data associated with a plurality of communication channels and/or workspaces. In at least one example, each virtual space can be associated with an indicator in the first sub-section 206. In some examples, an indicator can be associated with an actuation mechanism such that when actuated, can cause the application 140 to present data associated with the corresponding virtual space via the third region 150. In at least one example, a virtual space can be associated with all unread data associated with each of the workspaces with which the user is associated. That is, in some examples, if the user requests to access the virtual space associated with "unreads," all data that has not been read (e.g., viewed) by the user can be presented in the third region 150, for example in a feed. In such examples, different types of events and/or actions, which can be associated with different communication channels and/or virtual spaces, can be presented via a same feed. In some examples, such data can be organized and/or is sortable by workspace, time, type of action, communication channel, user, or the like. In some examples, such data can be associated with an indication of which user (e.g., member of the communication channel) posted the message and/or performed an action.

In some examples, each virtual space can be associated with a same type of event and/or action. For example, "threads" can be associated with messages, files, etc. posted in threads to messages posted in a communication channel and "mentions and reactions" (e.g., "M & R") can be associated with messages or threads where the user (e.g., User F) has been mentioned (e.g., via a tag) or another user has reacted (e.g., via an emoji, reaction, or the like) to a message or thread posted by the user. That is, in some examples, same types of events and/or actions, which can be associated with different communication channels and/or virtual spaces, can be presented via a same feed. As with the "unreads" virtual space, data associated with such virtual spaces can be organized and/or is sortable by workspace, time, type of action, communication channel, user, or the like.

In at least one example, the second region 148 of the user interface 144 can include a second sub-section 208, or sub-pane, that includes indicators representing communication channels. In some examples, the communication channels can include public channels, private channels, shared channels (e.g., between groups or organizations), single workspace channels, cross-workspace channels, combinations of the foregoing, or the like. In some examples, the communication channels represented can be associated with a single workspace. In some examples, the communication channels represented can be associated with different workspaces (e.g., cross-workspace). In at least one example, if a communication channel is cross-workspace (e.g., associated with different workspaces), the user may be associated with both workspaces, or may only be associated with one of the workspaces. In some examples, the communication channels represented can be associated with combinations of communication channels associated with a single workspace and communication channels associated with different workspaces.

In some examples, the second sub-section 208 can depict all communication channels, or a subset of all communication channels, that the user has permission to access (e.g., as determined by the permission data 126). In such examples, the communication channels can be arranged alphabetically, based on most recent interaction, based on frequency of interactions, based on communication channel type (e.g., public, private, shared, cross-workspace, etc.), based on workspace, in user-designated sections, or the like. In some examples, the second sub-section 208 can depict all communication channels, or a subset of all communication channels, that the user is a member of, and the user can interact with the user interface 144 to browse or view other communication channels that the user is not a member of but are not currently displayed in the second sub-section 208. In some examples, different types of communication channels (e.g., public, private, shared, cross-workspace, etc.) can be in different sections of the second sub-section 208, or can have their own sub-regions or sub-panes in the user interface 144. In some examples, communication channels associated with different workspaces can be in different sections of the second sub-section 208, or can have their own regions or panes in the user interface 144.

In some examples, the indicators can be associated with graphical elements that visually differentiate types of communication channels. For example, Channel B is associated with a square visual element instead of a circle visual element. As a non-limiting example, and for the purpose of this discussion, the square visual element can indicate that the user is not a current member of Channel B, whereas the circle visual element can indicate that the user is a current member of Channels A, D, and N. In some examples, additional or alternative graphical elements can be used to differentiate between public communication channels, private communication channels, shared communication channels, communication channels associated with different workspaces, and the like. In other examples, communication channels that the user is not a current member of may not be displayed in the second sub-section 208 of the user interface 144. In such examples, the user may navigate to a different interface (not shown) to browse additional channels that are accessible to the user but to which the user is not currently a member.

In addition to the second sub-section 208, the second region 148 can include a third sub-section 210, or sub-pane, that can include indicators representative of communications with individual users or multiple specified users (e.g., instead of all, or a subset of, members of an organization). Such communications can be referred to as "direct messages." That is, the third sub-section 210, or sub-pane, can include indicators representative of virtual spaces that are associated with private messages between one or more users.

As described above, in at least one example, the user interface 144 can include a third region 150, or pane, that is associated with a feed indicating messages posted to and/or actions taken with respect to a communication channel and/or other virtual space (e.g., a virtual space associated with direct message communication(s), a virtual space associated with event(s) and/or action(s), etc.) for facilitating communications. As described above, in at least one example, data associated with the third region 150 can be associated with the same or different workspaces. That is, in some examples, the third region 150 can present data associated with the same or different workspaces via an integrated feed. In some examples, the data can be organized and/or is sortable by workspace, time, type of action, communication channel, user, or the like. In some examples, such data can be associated with an indication of which user posted the message and/or performed an action. In examples where the third region 150 presents data associated with multiple workspaces, at least some data can be associated with an indication of which workspace the data is associated with.

For example, in FIG. 2, the user (e.g., User F), can interact with the user interface 144 to view data associated with the virtual space corresponding to "mentions and reactions." In FIG. 2, data associated with the virtual space can be associated with different communication channels and different workspaces. As illustrated, the data is organized by communication channel (e.g., #ChannelD and #ChannelK). However, as described above, the data can be organized and/or sortable by workspace, time, type of action, user, or the like. As illustrated, another user (e.g., User M) mentioned the user (e.g., User F) in a message, represented by the indicator 212 (e.g., a user interface element, object, etc.), which is associated with a communication channel (e.g., #ChannelD). The user (e.g., User F) also posted a message, represented by the indicator 214 (e.g., a user interface element, object, etc.), in the same communication channel. One or more other users reacted to the message, represented by the indicator 214, with an emoji. As such, indicators associated with both messages can be presented in the third region 150. Because the data is organized by communication channel, indicators associated with both messages are presented together. In at least one example, the communication channel (e.g., #ChannelD) can be associated with the second workspace (e.g., associated with the second indicator 202). In some examples, because the user is currently interacting with (or most recently interacted with) the second workspace, neither of the indicators 212 or 214 are associated with workspace indicators (e.g., the second indicator 202).

As illustrated, another user (e.g., User L) mentioned the user (e.g., User F) in a message, represented by the indicator 216 (e.g., a user interface element or object), which is associated with a communication channel (e.g., #ChannelK). As such, the indicator 216 can be presented in the third region 150. Because the data is organized by communication channel, the indicator 216 can be presented in a different position in the feed than the other indicators 212 and 214. In at least one example, the communication channel (e.g., #ChannelK) can be associated with the third workspace (e.g., associated with the third indicator 204). In some examples, because the user is currently interacting with (or most recently interacted with) the second workspace, the indicator 216 may include an indicator indicating that it is associated with the third workspace (e.g., the third indicator 204).

For purposes of this discussion, a "message" can refer to any electronically generated digital object provided by a user using the user computing device 104 and that is configured for display within a communication channel and/or other virtual space for facilitating communications (e.g., a virtual space associated with direct message communication(s), etc.) as described herein. A message may include any text, image, video, audio, or combination thereof provided by a user (using a user computing device). For instance, the user may provide a message that includes text, as well as an image and a video, within the message as message contents. In such an example, the text, image, and video would comprise the message. Each message sent or posted to a communication channel of the communication platform can include metadata comprising a sending user identifier, a message identifier, message contents, a group identifier, a communication channel identifier, or the like. In at least one example, each of the foregoing identifiers may comprise American Standard Code for Information Interchange (ASCII) text, a pointer, a memory address, or the like.

In some examples, a user can comment on a message in a "thread." A thread can be a message associated with another message that is not posted to a communication channel, but instead is maintained within an object associated with the original message. Messages and/or threads can be associated with file(s), emoji(s), app(s), etc.

A communication channel or other virtual space can be associated with data and/or content other than messages, or data and/or content that is associated with messages. For example, non-limiting examples of additional data that can be presented via the third region 150 of the user interface 144 include members added to and/or removed from the communication channel, file(s) (e.g., file attachment(s)) uploaded and/or removed from the communication channel, application(s) added to and/or removed from the communication channel, post(s) (data that can be edited collaboratively, in near real-time by one or members of a communication channel) added to and/or removed from the communication channel, description added to, modified, and/or removed from the communication channel, modifications of properties of the communication channel, etc.

In some examples, the third region 150 can comprise a feed associated with a single communication channel. In such examples, data associated with the communication channel can be presented via the feed. In at least one example, data associated with a communication channel can be viewable to at least some of the users of a group of users associated with a same group identifier. In some examples, for members of a communication channel, the content of the communication channel (e.g., messaging communications) can be displayed to each member of the communication channel. For instance, a common set of group-based messaging communications can be displayed to each member of the communication channel such that the content of the communication channel (e.g., messaging communications) may not vary per member of the communication channel. In some examples, data associated with a communication channel can appear differently for different users (e.g., based on personal configurations, group membership, etc.).

In at least one example, the format of the individual communication channels or virtual spaces may appear differently to different users. In some examples, the format of the individual communication channels or virtual spaces may appear differently based on which workspace a user is currently interacting with or most recently interacted with. In some examples, the format of the individual communication channels or virtual spaces may appear differently for different users (e.g., based on personal configurations, group membership, etc.).

In at least one example, the user interface 144 can include a search mechanism 218, wherein a user can input a search term and the server(s) 102 can perform a search associated with the communication platform. In some examples, the search can be performed across each workspace with which the user is associated, or the search can be restricted to a particular workspace, based on a user specification.

The user interface 144 is a non-limiting example of a user interface that can be presented via the user computing device 104 (e.g., by the application 140). In some examples, the application 140 can receive data from the workspace management component 116 and/or channel management component 118 and the application 140 can generate and present the user interface 144 based on the data. In other examples, the application 140 can receive data from the channel management component 118 and instructions for generating the user interface 144 from the workspace management component 116 and/or channel management component 118. In such an example, the application 140 can present the user interface 144 based on the instructions. Additional or alternative data can be presented via a user interface and additional or alternative configurations can be imagined.

Figure 3A:
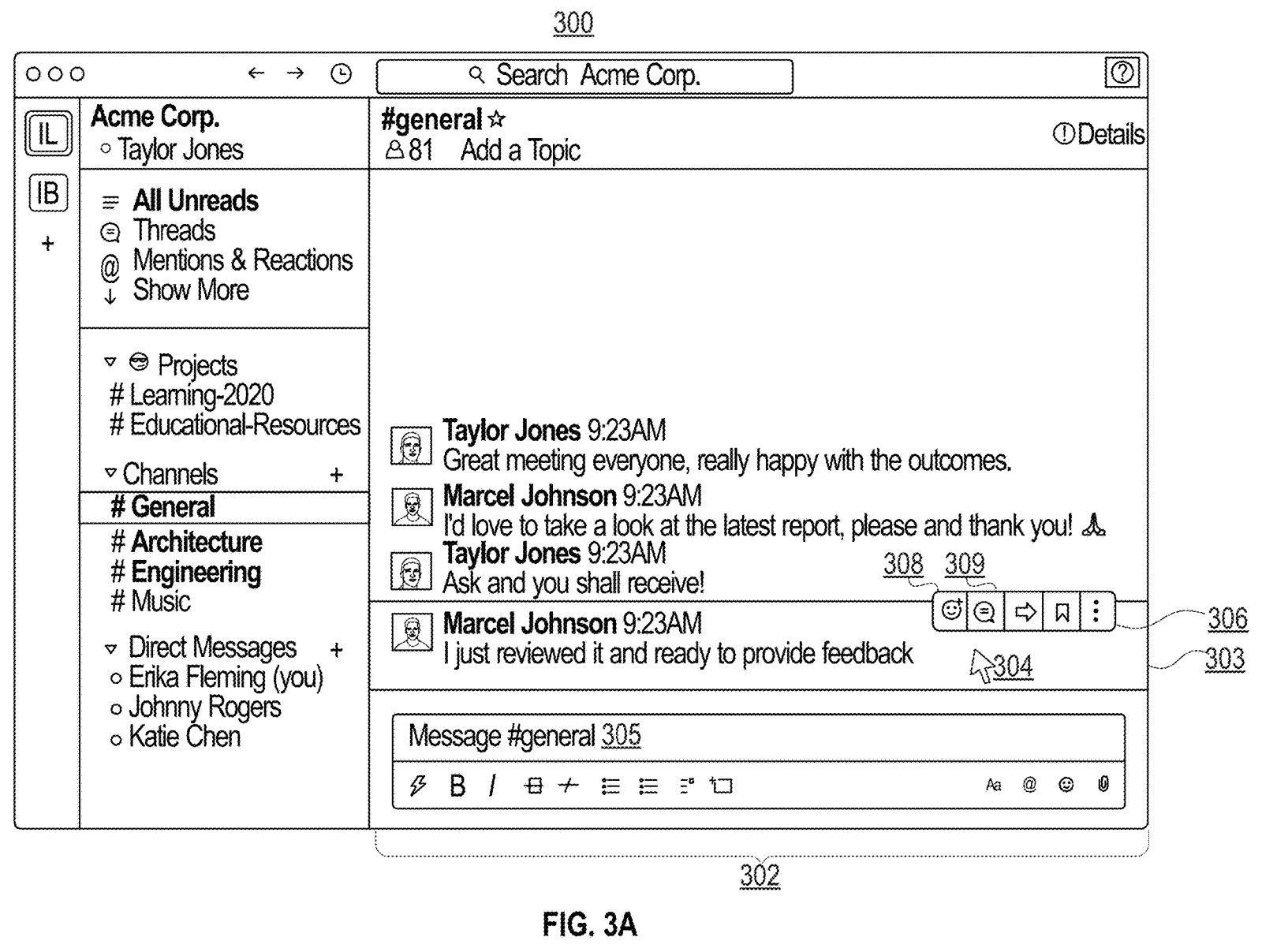
Figure 3B:
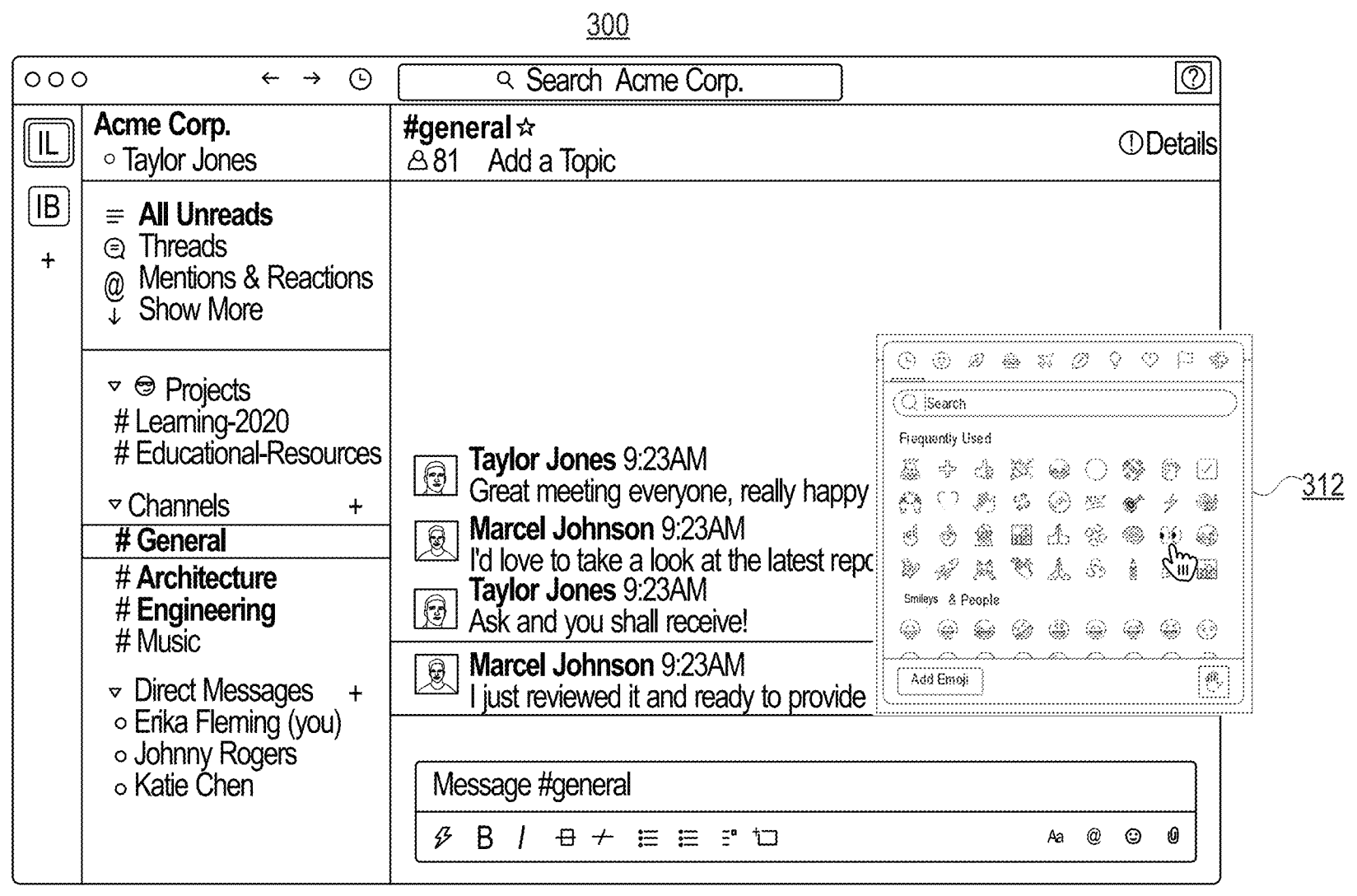
Figure 3C:
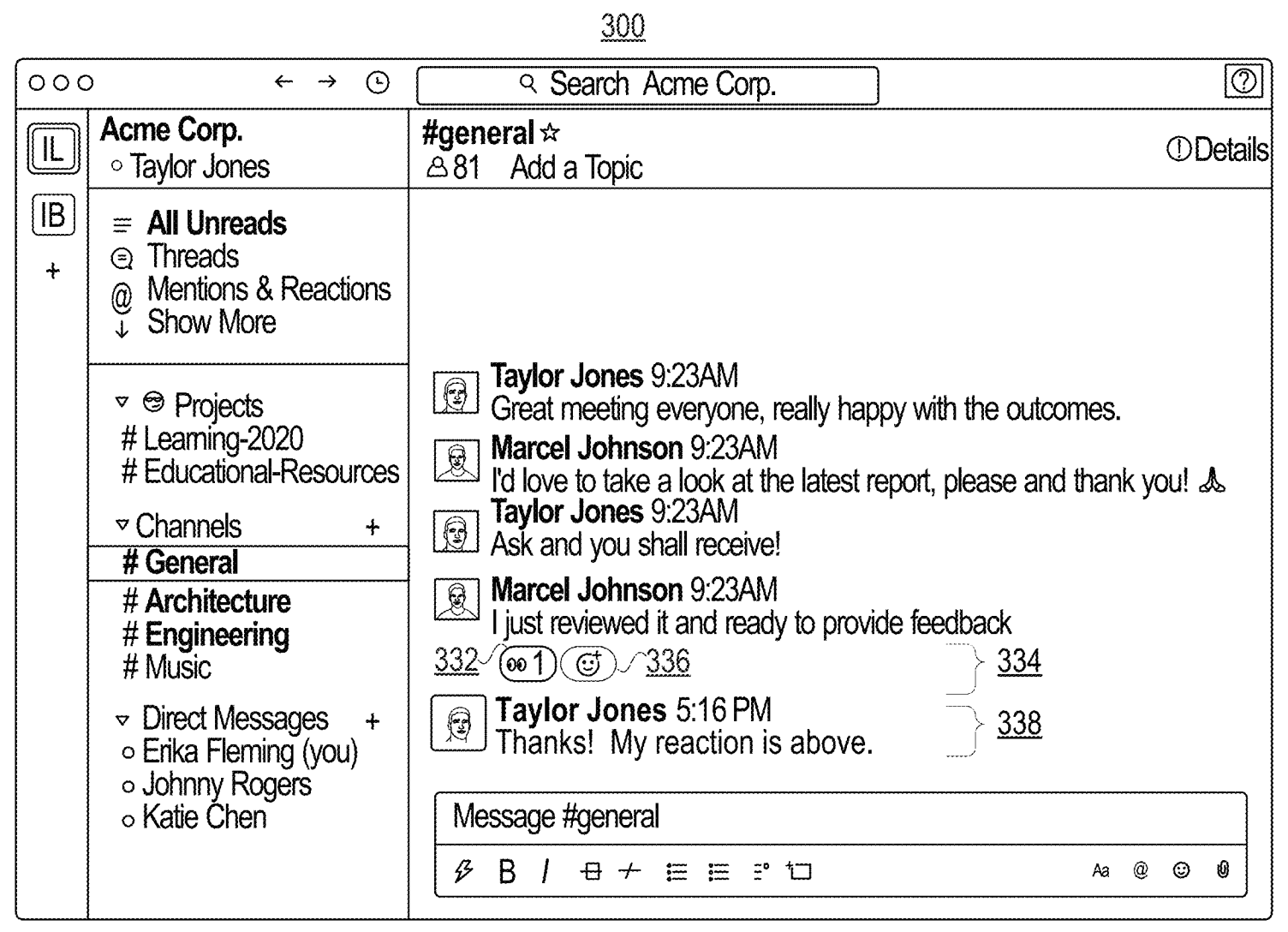

FIGS. 3A-3C illustrate an exemplary user interface 300 of a group-based communication platform for allowing a user to react to a message, respond to the message, or both, according to various embodiments. User interface 300 can include any of the features discussed above with respect to interface 144 and the discussion of those features is not repeated for brevity. Interface 300 includes a message display region 302 that can display one or more messages from one or more users associated with a workspace, as discussed above with respect to interface 144. As depicted, upon a user selection of a given message 303 (e.g., via a mouse hover input indicated by cursor 304) in the message display region 302, a menu 306 may be displayed. The menu 306 can include a user affordance 308 for reacting to the selected message and a user affordance 309 for responding to the selected message in a thread. The user can also respond to the message using the text box 305. In some embodiments, a user may react to the selected message by clicking on the emoji icon in the message box to access the emoji menu 312. In some embodiments, user affordance 309 may include emoji shortcuts displayed next to user affordance 308. A predetermined number of emoji shortcuts or any number of emoji shortcuts may be displayed in user affordance 309. In some embodiments, the emoji shortcuts are customized by the user. In some embodiments, the emoji shortcuts are predetermined by the organization or by a criteria, such as frequently or recently used emojis.

The group-based communication platform allows the user to react to a message (e.g., using one or more emoji) and to respond to the message (e.g., by composing a new message, which may include one or more emoji, one or more text strings, one or more attachments, or any combination thereof).

Upon a user selection of the user affordance 308, the electronic device displays one or more user interfaces for reacting to the message. With reference to FIG. 3B, the electronic device displays an emoji menu 312. The emoji menu comprises one or more collections of emoji, such as a collection of frequently used emoji (frequency of usage by the user above a predefined threshold), a collection of favorite emoji (e.g., as previously specified by the user), and a collection of emoji directed to a topic (e.g., "Smileys and People").

In response to a user selection of an emoji in the menu 312, the emoji is displayed as a reaction to the message (emoji provided as a reaction to a message are also referred to herein as "reactive emoji"). For example, with reference to FIG. 3C, the graphical representation of the selected emoji 332 is shown in a reaction area 334 as a reaction to the message. In the depicted example, an icon 336 is displayed in the reaction area to provide a second entry point to menu 312.

Upon a user selection of the user affordance 309, a user can compose a new message as a response to the selected message 303, which can comprise one or more text strings, images, emoji, and attachments. A response to the selected message can be displayed in the message display region 302. For example, with reference to FIG. 3C, the response ("Thanks! My reaction is above.") is shown in a response area 338 as a response to the message. The reaction area 336 and the response area 338, as shown in FIG. 3C, may be two distinct areas.

Figure 4A:
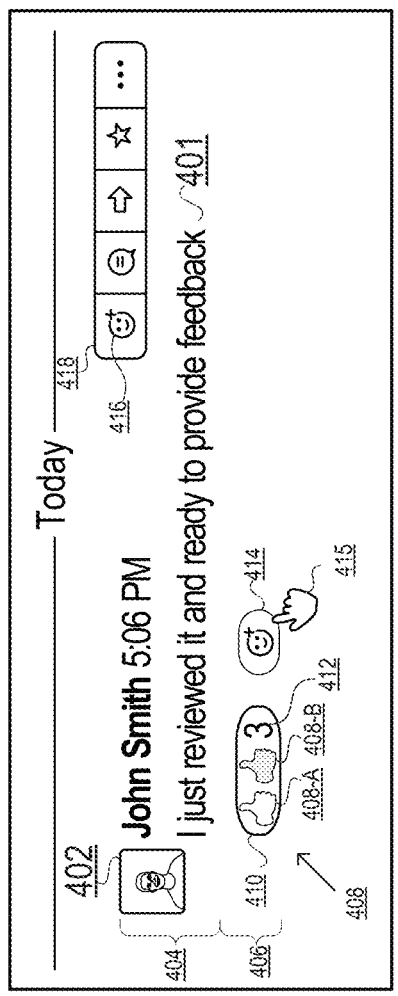
FIGS. 4A-4E illustrate aspects of a message display region of an interface associated with a group-based communication platform, according to various embodiments.

FIG. 4A illustrates a message display region of an interface associated with a group-based communication platform, such as interface 144 of FIG. 2 or interface 300 of FIG.

3A-3C, for displaying and reacting to one or more messages, according to various embodiments. The message display region may be displayed, for example, on a device associated with a first user of the group-based communication platform. The message display region may be provided, for example, in third region 150 of interface 144 of FIG. 2 or message display region 302 of interface 300 of FIG. 3 on a device of a first user.

A message 401 is displayed in message display area 404. The message 401 may be received from a second user ("John Smith" represented by icon 402) associated with the same channel as the first user, such as via a group-based communication platform as discussed above. In some embodiments, message 401 may be sent directly to a specific user through a direct message or a multi-person direct message.

One or more reactive emoji 408 are displayed in a reaction area 406 (the illustrated example includes a thumbs-up reactive emoji). The one or more reactive emoji 408 indicate reactions to the message from one or more users of the same channel or workspace to which the second user posted the message 401. The one or more reactive emoji 408 may be displayed based on selection of the one or more reactive emoji by the one or more users, such as via the reactive emoji selection process discussed above with respect to FIGS. 3A-3C.

In the illustrated example, the one or more reactive emoji includes two instances of the same reactive emoji 408 (thumbs-up emoji) that have different visual appearances from one another, such as different skin tone. In the illustrated example, a first instance 408-A of the reactive emoji 408 is a lighter shade than a second instance 408-B of the reactive emoji 408. The difference in appearance may reflect a personal preference of the one or more users that selected the reactive emoji 408 for reacting to the message 401. The shade of the reactive emoji is merely one example of a difference in appearance that may be available for a reactive emoji. Other examples of types of appearances that can be different for one or more types of emoji include graphical texture, size, pattern, and color.

In some embodiments, the difference in appearance is a difference in color intended to correspond to different skin tones. For example, referring to FIG. 4A, the first instance 408-A may have a lighter color that is intended to represent a lighter skin tone, and the second instance 408-B may have a darker color or darker shade of color that is intended to represent a darker skin tone. According to some embodiments, one or more instances of a reactive emoji displayed in reaction area 406 can have one or more colors corresponding to one or more skin tones and one or more reactive emoji displayed in reaction area 406 can have one or more colors or other types of appearances that are not associated with a skin tone, such as pink, purple, blue, yellow, checkered, etc. For example, in some embodiments, a non-skin tone instance of a reactive emoji that has a yellow color that is not intended to represent a skin tone may be displayed alongside instances of the reactive emoji that are one or more shades of brown that are intended to represent different skin tones.

According to various embodiments, different instances of the same reactive emoji may be displayed in a grouping. For example, the different instances may be displayed side-by-side and/or without any other type of reactive emoji between, such as shown in FIG. 4A. In some embodiments, the grouping is indicated by a graphical indicator, such as graphical object 410 in FIG. 4A, that indicates an association of the different instances of the reactive emoji. In some embodiments, all of the instances of the reactive emoji 408 are displayed within the graphical object 410.

In some embodiments, the graphical indicator of the grouping is or includes a numerical indicator 412 is provided that indicates a number of times the reactive emoji 408 of any appearance (e.g., of any skin tone) has been selected for display in association with the message. In the illustrated example, the thumbs-up reactive emoji was selected three times for reacting to the message. Thus, in the illustrated example, one of the appearances of the reactive emoji was selected two different times (e.g., by two difference users) and the other of the two appearance of the reactive emoji was selected once, leading to two instances of the reactive emoji and a count of three. In some embodiments, a user may select a specific emoji instance with a particular skin tone from the emoji affordance 416, resulting in the emoji being added to grouping 410 and an incremented count 412. In some embodiments, a user may select grouping 410, resulting in the count being incremented to 4, and a general emoji being selected without a skin tone preference.

According to some embodiments, an order of display of the different instances of the reactive emoji is based on an order of selection of the reactive emoji. For example, the reactive emoji 408-A having the lighter shade (e.g., lighter skin tone) may have been selected by a user before the reactive emoji 408-B having the darker shade (e.g., darker skin tone) was selected by a different user, resulting in the lighter shade instance 408-A being shown to the left of the darker shade instance 408-B. Other ordering options may be used, such as based on the total number of users that selected a given variation, gradient, a custom ordering, etc.

Figure 4B:
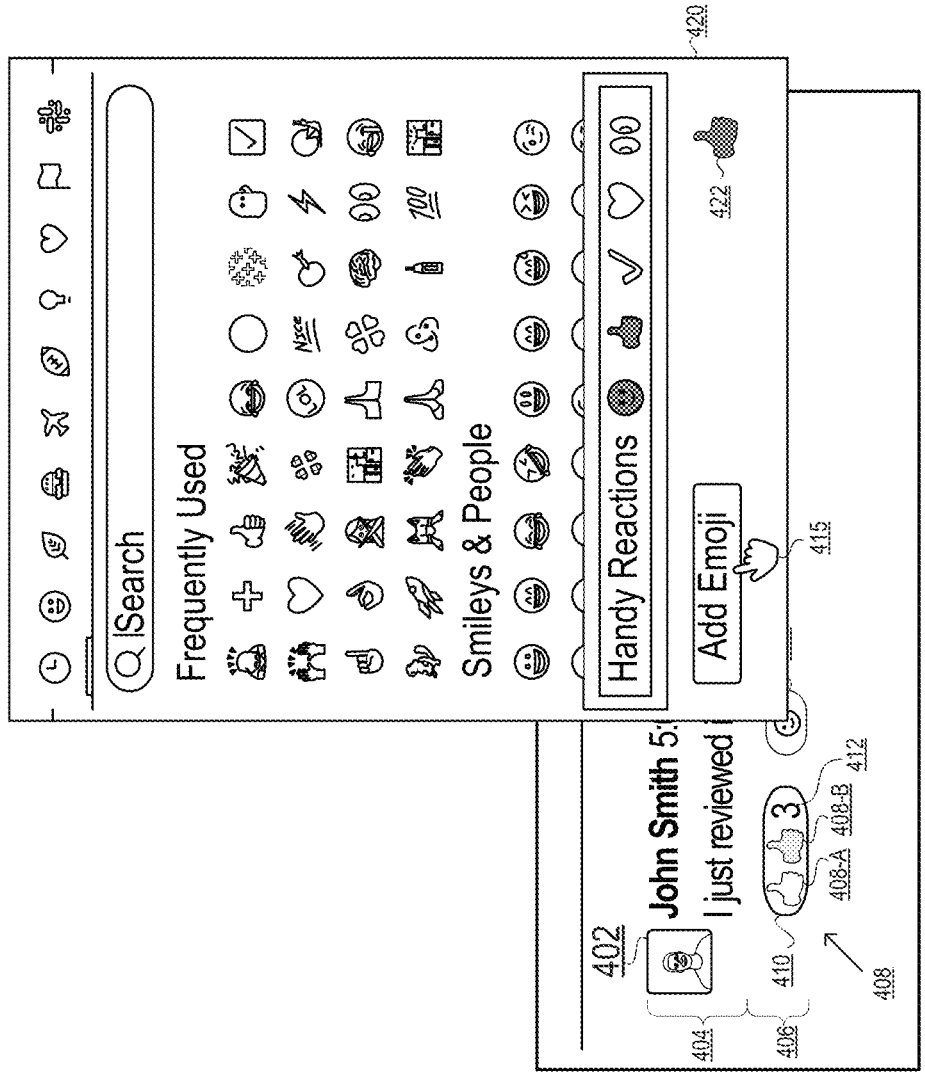

According to various embodiments, the second user may desire to provide a reactive emoji as a reaction to the message 401. The user may request an emoji selection menu for selecting an emoji for reacting to the message, such as via a selection (e.g., via pointer 415) of affordance 414 in the reaction area 406 or affordance 416 in message action menu 418. According to various embodiments, in response to the user request, an emoji selection menu may be displayed, such as emoji selection menu 420 of FIG. 4B. The emoji selection menu 420 may be displayed, for example, as a pop-up menu alongside the message. The emoji selection menu 420 includes one or more reactive emoji, which can include the same reactive emoji already displayed in the reaction area 406 (e.g., the thumbs-up reactive emoji) but having a different appearance (e.g., different skin tone) than those already displayed in the reaction area 406, such as reactive emoji 422 in FIG. 4B. In some embodiments, only a single appearance of a given reactive emoji is available in the emoji selection menu 420. In some embodiments, the appearance of the emoji that is available in the menu 420 may be based on a user-definable preference, which may be changed via a preference selection interface. In other embodiments, multiple different appearances of the same reactive emoji may be provided in the emoji selection menu 420 for selection by the user.

Figure 4C:
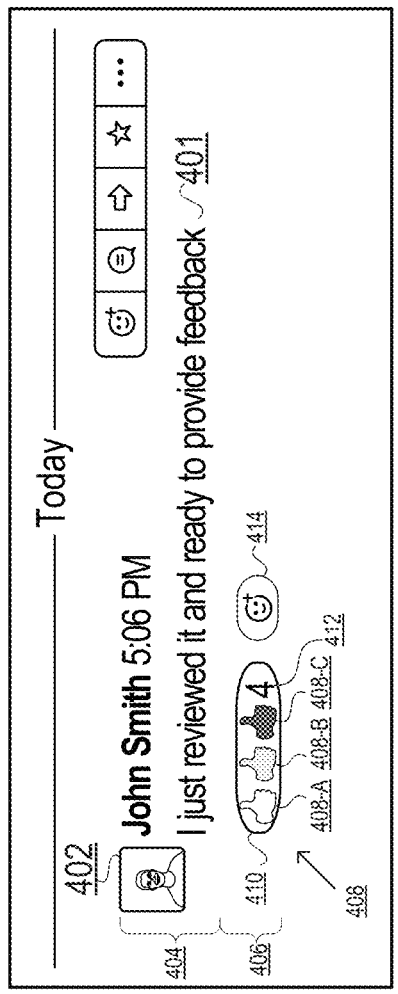

The second user may select the reactive emoji 422 for displaying in the reaction area 406. In response to the user's selection of the reactive emoji 422, the determination is made whether the appearance of the reactive emoji (e.g., the skin tone) selected from the menu 420 by the second user is the same as an instance of the same reactive emoji already displayed in the reaction area 406. If the second user's selected reactive emoji has a different appearance than the same reactive emoji already displayed, then a third instance 408-C of the reactive emoji that has a third appearance that is different than the first and second instances 408-A and 408-B, is displayed in the reaction area 406 in the grouping with the first and second instances 408-A and 408-B, as shown in FIG. 4C.

According to various embodiments, the graphical object 410 is expanded to accommodate the additional instance 408-C. According to various embodiments, the numerical indicator 412 may be incremented by one to reflect the second user's selection. Thus, rather than treating different appearances of the same type of reactive emoji the same as if they were different reactive emoji, different appearances of the same reactive emoji are treated as having a commonality, as indicated by the grouping and, in some variations, by the graphical object 410 and/or numerical indicator 412. This can be particularly useful in a group-based communication platform where users may desire to have emoji appearances that reflect their personal preferences but where the similarities between their reactions to a given message should also be reflected. According to various embodiments, the groupings of the different appearances of a given reactive emoji may indicate a degree of solidarity between the users that selected the reactive emoji, while still acknowledging the diversity of the users and/or their preferences.

If the selected appearance of the reactive emoji 408 were already in the display area 404, then no additional instance of the reactive emoji would be added to the display area 404. Instead, according to various embodiments, the numerical indicator 412 may be incremented to reflect the second user's selection. If the reactive emoji of any appearance was not already in the display area 404, than a first instance of the reactive emoji would be displayed in the display area 404.

In some embodiments, the user may desire to react to the message with one of the already-displayed reactive emoji appearances and may do so by providing a user input associated with the particular reactive emoji instance. For example, referring to FIG. 4A, if the user desires to react with the same reactive emoji variation as reactive emoji instance 408-A, the user can click on the reactive emoji instance 408-A to select that reactive emoji appearance as the users's reaction to the message. According to various embodiments, the users's selection may increment the numerical indicator 412. According to various embodiments, the user can remove the user's selection by clicking again on the reactive emoji instance 408-A, which can reduce the numerical indicator count. According to various embodiments, the user can provide multiple reactions comprising multiple different variations of the same reactive emoji by clicking on multiple instances of the reactive emoji 408.

Figure 4D:
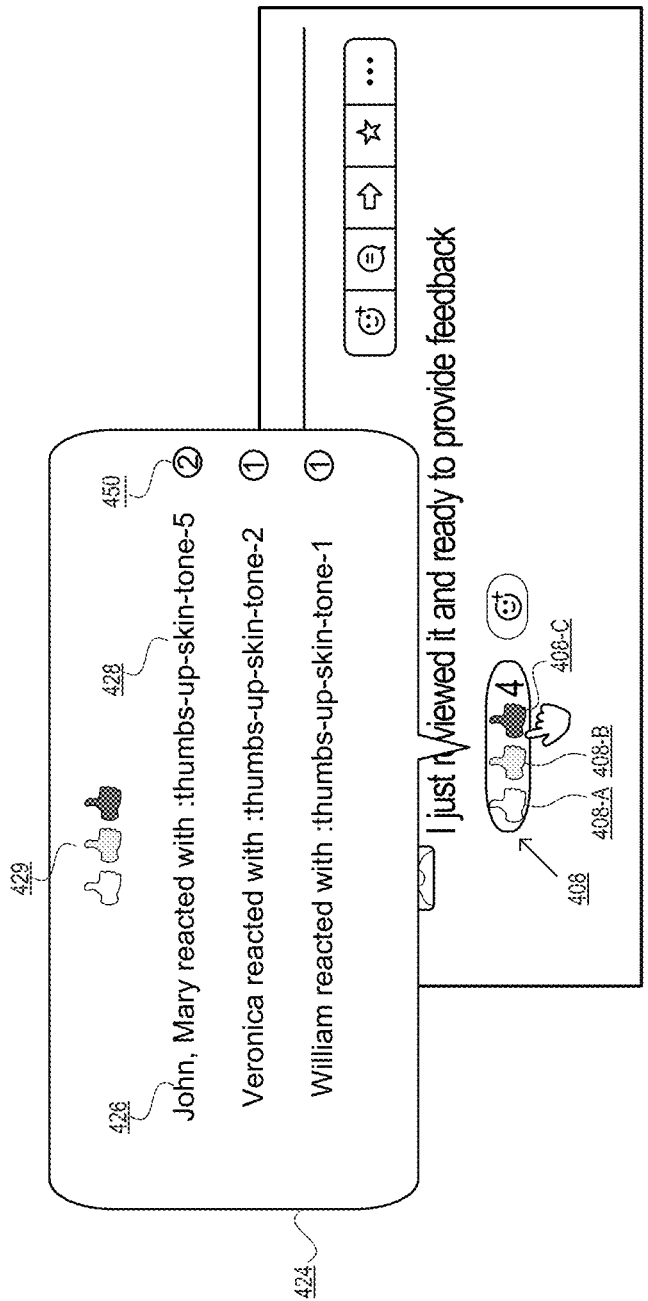

According to various embodiments, the second user may desire to view details of which users selected which reactive emoji. Accordingly, with reference to FIG. 4D, the second user may request details of the reactive emoji grouping 408-A,B,C, such as by clicking on the grouping of reactive emoji instances 408-A,B,C or hovering over the grouping. In response to the request, details of user selections of the reactive emoji 408 may be displayed. According to various embodiments, in response to the user request, a message box 424 may be displayed that includes information about which users selected the different variations of the reactive emoji 408. In the illustrated embodiment, the information includes user names 426 and an indication 428 of the reactive emoji appearance selected by the given user(s). In the illustrated embodiment, indication 428 is a text description of the reactive emoji and its variation—John and Mary selected the reactive emoji having skin tone 5, Veronica selected the reactive emoji having skin tone 2, and William selected the reactive emoji having skin tone 1. In some embodiments, the indication 428 is a representation of the particular appearance of the reactive emoji. According to various embodiments, the different variations of the reactive emoji are displayed in the message box 424, such as indicated by reference numeral 429. In some embodiments, a count 450 can be shown for one or more of the reactive emoji variations in the message box 424 indicating the number of times that the respective reactive emoji variation was selected. In some embodiments, if one or more users have clicked on the grouping 408, the message box 424 may include an indication listing the users who selected the reactive emoji without specifying a skin tone. If a user removes his/her selection of the reactive emoji, the user's name is removed from the list and the count is decremented accordingly. In some embodiments, a user may select a reactive emoji with different skin tones, resulting in the user's name being listed multiple times in accordance with the corresponding emoji having the specific skin tone.

Figure 4E:
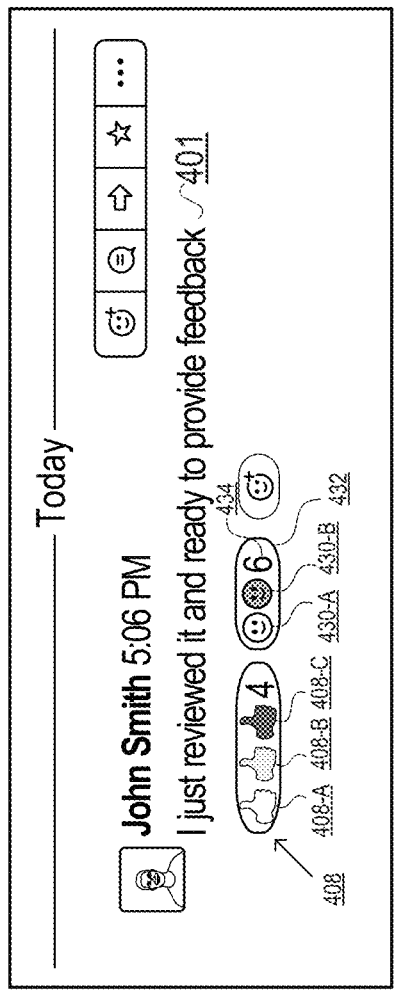

According to various embodiments, multiple different types of reactive emoji may have multiple appearance variations and different types of reactive emoji may be displayed in different groupings. FIG. 4E illustrates an example in which two different variations of a smiling face reactive emoji were selected by various users and two instances of the smiling face reactive emoji (430-A and 430-B) are displayed in a separate grouping from the grouping of the reactive emoji 408. In the illustrated example, a graphical object 432 is used to indicate the grouping of the two instance of smiling face reactive emoji and a numerical indicator 434 is used to indicate that six users selected the smiling face reactive emoji of any appearance as a reaction to the message 401.

FIG. 5 illustrates a method 500 for displaying multiple variations of the same reactive emoji in a message interface, according to various embodiments. Method 500 may be performed by one or more portions of environment 100 of FIG. 1. In some embodiments, method 500 is performed at least partially on a user computing device, such as user computing device 104 of FIG. 1. In some embodiments, method 500 is performed by user computing device 104 in communication with one or more servers 102 of FIG. 1.

At step 502, a message is displayed within an interface of a group-based communication platform on a device associated with a user of the group-based communication platform. In some embodiments, the message is originated by a first user, such as user "John Smith" of FIG. 4A and is displayed within interface 144 of FIG. 2 or interface 300 of FIG. 3 on a user computing device 104 of a second user associated with a channel of a group-based communication channel. The message may be displayed to one or more other users associated with the same channel.

At step 504, a selection is received from the second user selecting a first reactive emoji having a first appearance (e.g., a first skin tone) for display in association with the message. For example, with reference to FIG. 4B, the second user may select reactive emoji 422 from the menu 420. In some embodiments, the user may select the first reactive emoji having the first appearance from among a plurality of available first reactive emoji having different appearances, such as available in menu 420. In other embodiments, the particular appearance of the first reactive emoji available to the user for selection, such as in menu 420, may be based on a predefined setting, which can be a user definable preference. In some embodiments, a user definable preference may control the appearance of a plurality of different reactive emoji available to the user for selecting in response to the message. For example, a thumbs-up emoji and a smiling-face emoji available for selection by the user for reacting to the message may both have the same appearance (e.g., the same skin tone) based on the user definable preference.

At step 506, in response to receiving the selection from the second user of the reactive emoji having the first appearance, a first instance of the selected first reactive emoji having the first appearance (e.g., a first skin tone) is displayed in a first grouping with at least a second instance of the first reactive emoji having a second appearance (e.g., a second skin tone) that is different than the first appearance. For example, with reference to FIG. 4C, instance 408-C of reactive emoji 408, which has a darker shade (e.g., a darker skin tone) is displayed side-by-side with instances 408-A and 408-B, which have lighter shades (e.g., lighter skin tones), in the reaction area 406 associated with the message 401.

According to various embodiments, a graphical indication of the grouping of the first instance of the first reactive emoji having the first skin tone with the at least the second instance of the first reactive emoji having the second skin tone is displayed. For example, in FIG. 4C graphical object 410 encompasses all three instances of the emoji 408 as a visual indicator of the grouping of the three instances. Additionally, numerical indicator 412 can be provided to indicate a total count of the number of times a reactive emoji of any skin tone has been selected for display in association with the message. In some embodiments, the numerical indicator 412 is displayed within the graphical object 410.

According to various embodiments, an order of display of the first instance of the first reactive emoji having the first skin tone and the at least the second instance of the first reactive emoji having the second skin tone is based on a temporal order of selection of the first instance of the first reactive emoji having the first skin tone and the at least the second instance of the first reactive emoji having the second skin tone. For example, with reference to FIG. 4C, the variation of the reactive emoji 408 associated with the first instance 408-A was selected by a user prior to the variation of the reactive emoji 408 associated with the second instance 408-B, which was selected prior to the variation of the reactive emoji 408 associated with the third instance 408-C. In other embodiments the order is based on some other parameter, such as a total number of selections of the particular variation (e.g., the variation associated with the first instance was selected by more users than the variation associated with the second instance).

According to various embodiments, a user may request to display information associated with the first grouping of the first instance of the first reactive emoji having the first skin tone with the at least the second instance of the first reactive emoji having the second skin tone and, in response to the user request, a first list of one or more users that selected the first reactive emoji having the first skin tone and a second list of one or more users that selected the first reactive emoji having the second skin tone may be displayed. For example, with reference to FIG. 4D, a message box 424 may be displayed, such as in response to a hove or user click, and lists of users that selected the reactive emoji having the respective appearances are displayed in the message box 424 (a first list associated with the first instance, a second list associated with the second instance, and a third list associated with the third instance).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A computer-implemented method, comprising:
displaying a message within an interface of a group-based communication platform on an electronic device associated with a user of the group-based communication platform;
receiving a selection of two or more instances of a same reactive emoji with different skin tones for display in association with the message; and
in response to receiving the selection, displaying a reactive emoji grouping that includes at least the two or more instances of the same reactive emoji with the different skin tones and an indication of a quantity of the two or more instances of the same reactive emoji with the different skin tones, wherein the reactive emoji grouping is displayed in association with the message within the interface of the group-based communication platform.

2. The computer-implemented method of claim 1, wherein an order of display of the two or more instances of the same reactive emoji with the different skin tones is based on a temporal order of selection of the two or more instances of the same reactive emoji with the different skin tones.

3. The computer-implemented method of claim 1, further comprising:
receiving a request to display information associated with the reactive emoji grouping; and
in response to the request, displaying a first list of one or more users that selected a first reactive emoji with a first skin tone and a second list of one or more users that selected the first reactive emoji with a second skin tone different from the first skin tone.

4. The computer-implemented method of claim 3, further comprising:
displaying a numerical indicator for each skin tone in the reactive emoji grouping, the numerical indicator indicating a number of selections of a respective skin tone.

5. The computer-implemented method of claim 1, wherein the quantity of the two or more instances of the same reactive emoji is different from a quantity of the different skin tones displayed in the reactive emoji grouping.

6. An electronic device, comprising:
one or more processors;
a memory; and
instructions stored in the memory and executable by the one or more processors to cause the electronic device to:

display a message within an interface of a group-based communication platform on the electronic device associated with a user of the group-based communication platform;

receive a selection of two or more instances of a same reactive emoji with different skin tones for display in association with the message; and in response to the selection, display a reactive emoji grouping that includes at least the two or more instances of the same reactive emoji with the different skin tones and an indication of a quantity of the two or more instances of the same reactive emoji with the different skin tones, wherein the reactive emoji grouping is displayed in association with the message within the interface of the group-based communication platform.

7. The electronic device of claim 6, wherein an order of display of the two or more instances of the same reactive emoji with the different skin tones is based on a temporal order of selection of the two or more instances of the same reactive emoji with the different skin tones.

8. The electronic device of claim 6, wherein the instructions are further executable by the one or more processors to cause the electronic device to:

receive a request to display information associated with the reactive emoji grouping; and in response to the request, display a first list of one or more users that selected a first reactive emoji with a first skin tone and a second list of one or more users that selected the first reactive emoji with a second skin tone different from the first skin tone.

9. The electronic device of claim 8, wherein the instructions are further executable by the one or more processors to cause the electronic device to:

display a numerical indicator for each skin tone in the reactive emoji grouping, the numerical indicator indicating a number of selections of a respective skin tone.

10. A non-transitory computer-readable storage medium storing instructions that are executable by one or more processors to:

display a message within an interface of a group-based communication platform on an electronic device associated with a user of the group-based communication platform;

receive a selection of two or more instances of a same reactive emoji with different skin tones for display in association with the message; and in response to receiving the selection, display a reactive emoji grouping that includes at least the two or more instances of the same reactive emoji with the different skin tones and an indication of a quantity of the two or more instances of the same reactive emoji with the different skin tones, wherein the reactive emoji grouping is displayed in association with the message within the interface of the group-based communication platform.

11. The non-transitory computer-readable storage medium of claim 10, wherein an order of display of the two or more instances of the same reactive emoji with the different skin tones is based on a temporal order of selection of the two or more instances of the same reactive emoji with the different skin tones.

12. The non-transitory computer-readable storage medium of claim 10, wherein the instructions are further executable by the one or more processors to:

receive a request to display information associated with the reactive emoji grouping; and in response to the request, display a first list of one or more users that selected a first reactive emoji with a first skin tone and a second list of one or more users that selected the first reactive emoji with a second skin tone different from the first skin tone.

13. The non-transitory computer-readable storage medium of claim 12, wherein the instructions are further executable by the one or more processors to:

display a numerical indicator for each skin tone in the reactive emoji grouping, the numerical indicator indicating a number of selections of a respective skin tone.

* * * * *